(12) United States Patent
Hanya

(10) Patent No.: US 8,745,844 B2
(45) Date of Patent: Jun. 10, 2014

(54) HEAD ASSEMBLY ATTACHING METHOD, CYLINDRICAL JIG, AND CAULKING BALL

(75) Inventor: Masao Hanya, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 233 days.

(21) Appl. No.: 13/173,035

(22) Filed: Jun. 30, 2011

(65) Prior Publication Data

US 2012/0023734 A1 Feb. 2, 2012

(30) Foreign Application Priority Data

Jul. 27, 2010 (JP) .................................. 2010-168690

(51) Int. Cl.
 *G11B 5/48* (2006.01)
 *B23P 17/00* (2006.01)

(52) U.S. Cl.
 USPC ....... 29/523; 29/603.03; 29/527.1; 360/244.6

(58) Field of Classification Search
 USPC ............. 29/527.1, 505, 521, 522.1, 523, 282, 29/283.5, 603.03, 603.04; 360/244.6
 See application file for complete search history.

(56) References Cited

U.S. PATENT DOCUMENTS

| | | | |
|---|---|---|---|
| 1,404,444 A | | 1/1922 | Kishline |
| 3,908,615 A | * | 9/1975 | Hayward .................... 123/90.35 |
| 5,153,794 A | * | 10/1992 | Hinlein ...................... 360/244.6 |
| 5,546,649 A | * | 8/1996 | Shimanuki ................. 29/603.03 |
| 5,706,574 A | * | 1/1998 | Shimanuki ................. 29/603.03 |
| 6,035,681 A | * | 3/2000 | Chung et al. ...................... 72/42 |
| 6,269,532 B1 | | 8/2001 | Toensing |
| 7,562,434 B2 | * | 7/2009 | Ishikawa et al. ........... 29/603.03 |
| 2007/0146934 A1 | * | 6/2007 | Boljanovic et al. ........ 360/244.6 |

FOREIGN PATENT DOCUMENTS

| | | |
|---|---|---|
| JP | 54-133472 | 10/1979 |
| JP | 56-22613 | 5/1981 |
| JP | 62-6926 | 1/1987 |
| JP | 5-303855 | 11/1993 |
| JP | 7-085635 | 3/1995 |
| JP | 7-192420 | 7/1995 |
| JP | 2007-213640 | 8/2007 |
| JP | 2007-213742 | 8/2007 |

\* cited by examiner

*Primary Examiner* — David Bryant
*Assistant Examiner* — Jun Yoo
(74) *Attorney, Agent, or Firm* — Jordan and Hamburg LLP

(57) ABSTRACT

A method of attaching a head assembly having an annular hollow boss to an arm having a through hole of a carriage is provided. The head assembly includes a load beam of a head suspension and a base plate fixed to a base part of the load beam. The boss is formed on the base plate. The method includes steps of, inserting the boss into the through hole, thereby setting the head assembly to the arm of the carriage, supplying lubricant along the cylindrical jig to the caulking ball and pushing the caulking ball with the cylindrical jig to pass the caulking ball through an inside of the boss and diametrally expand and plastically deform the boss, thereby fixedly fitting the boss of the head assembly to the through hole of the arm of the carriage. The method causes no deformation of a flange formed on the base plate during caulking and is achievable at low cost.

7 Claims, 4 Drawing Sheets ic vibration technique of '640 document has a problem of increasing costs because applying ultrasonic vibration several times increases the number of processes.

HEAD ASSEMBLY ATTACHING METHOD, CYLINDRICAL JIG, AND CAULKING BALL

BACKGROUND OF THE INVENTION

1. Field of the Invention

The present invention relates to a head assembly attaching method using ball caulking and to a cylindrical jig and caulking ball used for the method.

2. Description of Related Art

A head assembly attaching method by ball caulking is disclosed in, for example, Japanese Unexamined Patent Application Publications No. H07-85635 and No. H05-303855.

FIG. 7 is a partly broken side view illustrating an example of a head assembly attaching method according to a related art. In FIG. 7, a carriage 101 has a plurality of arms 103 each having a through hole 105 to which a head assembly 109 is fitted by caulking with the use of a steel caulking ball 107.

The head assembly 109 includes a head suspension 111 and a flexure (not illustrated) attached to the head suspension 111. The flexure has a slider 113.

The head suspension 111 includes a load beam 121 having a resilient part 115 and a rigid part 116. The head suspension 111 also includes a base part 118 that is integrated with the resilient part 115. To the base part 118, a base plate 117 is attached. The slider 113 is arranged at a front end of the load beam 121 to form a head. The slider 113 is attached to the flexure, and the flexure is supported with the load beam 121.

The base plate 117 has a boss 117a and a flange 117b. The boss 117a is inserted into the through hole 105 of the arm 103. A plurality of the head assemblies 109 are arranged for the arms 103 of the carriage 101, respectively, and the caulking ball 107 is successively passed through the bosses 117a of the base plates 117, to expand and plastically deform the bosses 117a in the through holes 105, thereby fixing the base plates 117 of the head assemblies 109 to the holes 105 of the arms 103.

If the flange 117b of the base plate 117 is deformed at the time of caulking, the load and resonance characteristics of the head assembly 109 will deteriorate. The flange 117b, therefore, must not be deformed, or the head assembly 109 will not satisfy requirements for high accuracy.

In this regard, Japanese Unexamined Patent Application Publication No. H07-192420 ('420 document) proposes a base plate having a special shape so that a flange of the base plate will not be deformed by caulking and Japanese Unexamined Patent Application Publication No. 2007-213640 ('640 document) proposes a technique of applying ultrasonic vibration several times during caulking.

The base plate of '420 document has a problem of increasing costs due to the special shape of the base plate.

The ultrasonic vibration technique of '640 document has a problem of increasing costs because applying ultrasonic vibration several times increases the number of processes.

SUMMARY OF THE INVENTION

An object of the present invention is to provide a head assembly attaching method capable of preventing deformation of a flange of a head assembly without increasing costs and a cylindrical jig and caulking ball used for the head assembly attaching method.

In order to accomplish the object, a first aspect of the present invention provides a method of attaching a head assembly having a boss to an arm having a through hole of a carriage. The head assembly includes a head suspension that includes a load beam, a base plate fixed to a base part of the load beam, and a boss formed on the base plate to be fitted to the through hole with use of a caulking ball. The method includes steps of inserting the boss into the through hole, thereby setting the head assembly to the arm of the carriage, supplying lubricant along a cylindrical jig to the caulking ball set on the boss, and pushing the caulking ball with the cylindrical jig to pass the caulking ball through an inside of the boss and diametrally expand and plastically deform the boss, thereby fixedly fitting the boss of the head assembly to the through hole of the arm of the carriage.

A second aspect of the present invention provides a cylindrical jig used for the head assembly attaching method of the first aspect. The cylindrical jig includes a cylindrical body and a lubricant path formed through the cylindrical body and opened at an end of the cylindrical body. The end of the cylindrical body is brought into contact with a caulking ball. Lubricant is fed with or without pressure through the lubricant path toward the caulking ball.

According to the first aspect, the lubricant allows caulking to be carried out smoothly without deforming a flange of the base plate.

The carriage may have a plurality of arms to which a plurality of head assemblies are fitted, respectively. In this case, the caulking ball is successively passed through the bosses with lubricant being continuously fed to the caulking ball, to caulk each boss in each through hole without deforming the flange of the base plate and properly fit each head assembly to the corresponding arm of the carriage.

The cylindrical jig to push the caulking ball is utilized as a means to feed the lubricant to the caulking ball. It minimizes costs.

According to the second aspect, the lubricant path formed through the cylindrical jig surely supplies lubricant to the caulking ball.

DETAILED DESCRIPTION OF EMBODIMENTS

Embodiments of the present invention will be explained in detail with reference to the drawings. Each embodiment employs a cylindrical jig and lubricant to fit a head assembly to an arm of a carriage by caulking without deforming a flange of the head assembly and without increasing costs.

Figure 1:
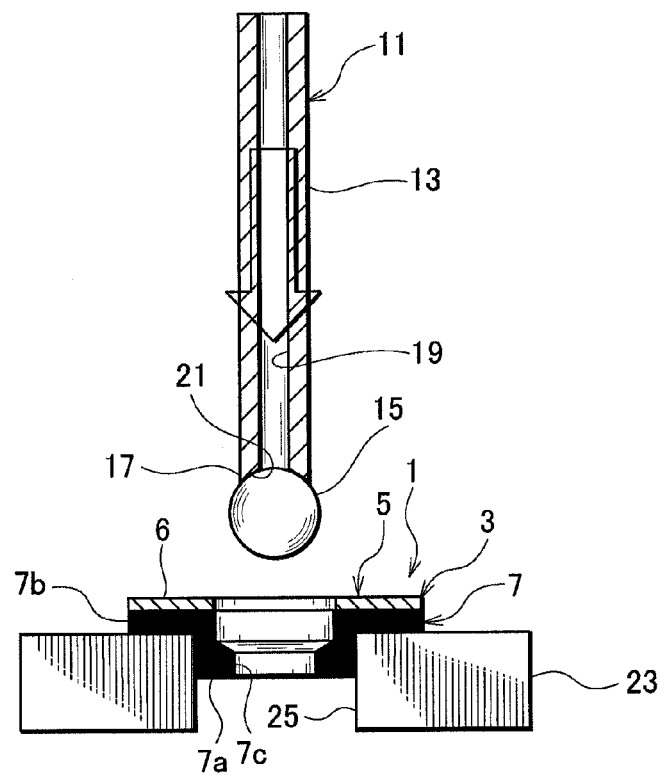
FIG. 1 is a sectional view illustrating a head assembly attaching method using a cylindrical jig according to a first embodiment of the present invention as well as a caulking ball.
Figure 2:
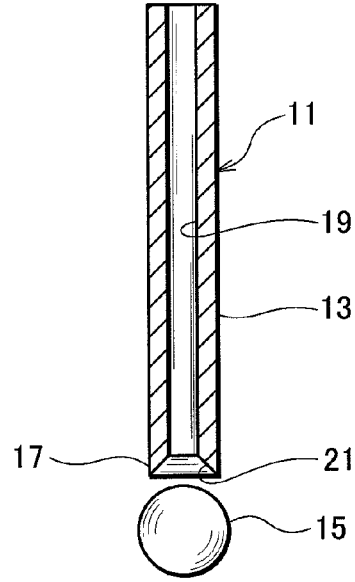
FIG. 2 is a sectional view illustrating the cylindrical jig and caulking ball of FIG. 1.

A first embodiment of the present invention will be explained with reference to FIGS. 1 and 2 in which FIG. 1 is a sectional view illustrating a head assembly attaching method using a cylindrical jig according to the first embodiment of the present invention as well as a caulking ball and FIG. 2 is a sectional view illustrating the cylindrical jig and caulking ball of FIG. 1.

Figure 7:
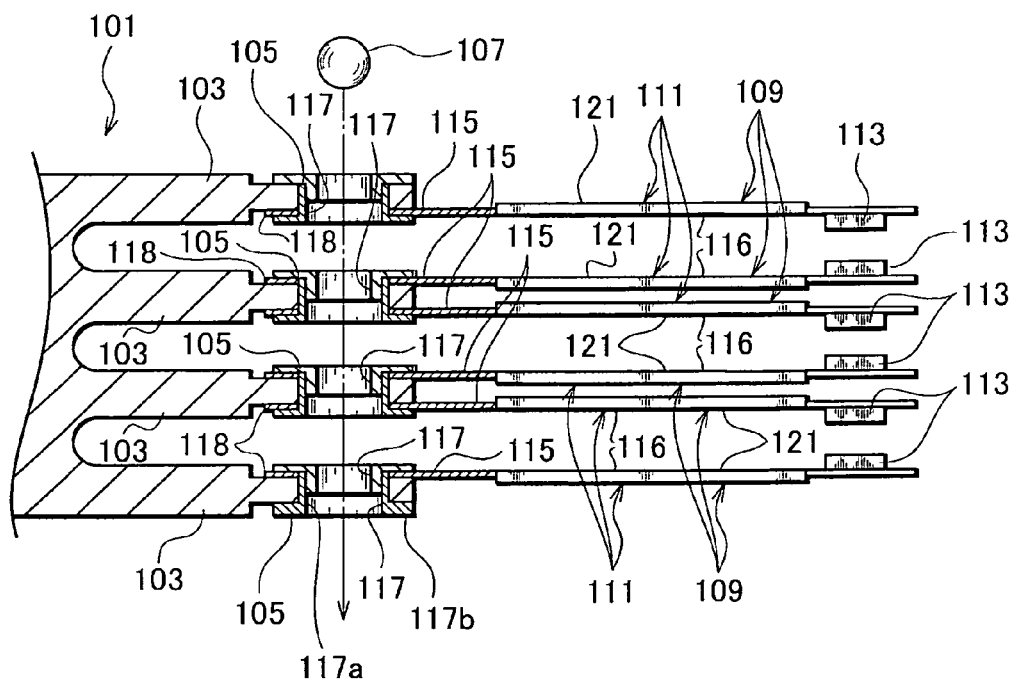
FIG. 7 is a sectional view illustrating a head assembly attaching method according to a related art, a plurality of head assemblies being attached to arms of a carriage, respectively.

A head assembly 1 illustrated in FIG. 1 has the same structure as the head assembly 109 illustrated in FIG. 7. Namely, the head assembly 1 includes a head suspension 3 having a flexure (not illustrated) that is provided with a slider (not illustrated).

The head suspension 3 includes a load beam 5 and a base plate 7 that is laid on and fixed to a base part 6 of the load beam 5.

The base plate 7 has a circular or annular hollow boss 7a and a flange 7b. The flange 7b is fixed to the base part 6 by, for example, laser spot welding. In FIGS. 1 and 2, the cylindrical jig 11 has a cylindrical body 13 and a lubricant path 19. The lubricant path 19 opens at an end 17 of the cylindrical body 13, the end 17 being brought into contact with the caulking ball 15 made of, for example, steel. An upper part of the lubricant path 19 is connected to a lubricant supply unit (not illustrated). The end 17 of the cylindrical jig 11 has a tapered contact mouth 21 defined by a tapered face so that the tapered contact mouth 21 stably comes in contact with the caulking ball 15. The contact mouth 21 communicates with the lubricant path 19.

To fit the head assembly 1 having the hollow boss 7a to an arm 23 having a through hole 25 of a carriage, the boss 7a of the base plate 7 is inserted into the through hole 25 of the arm 23, thereby setting the head assembly 1 to the arm 23 of the carriage. The caulking ball 15 is passed through an inside of the boss 7a, i.e., passed along an inner circumference 7c of the boss 7a, to diametrally expand and plastically deform the boss 7a, thereby fixedly fitting the boss 7a of the base plate 7 to the through hole 25 of the arm 23.

At this time, the caulking ball 15 is set or placed on an upper part of the inside or the inner circumference 7c of the boss 7a and the contact mouth 21 of the cylindrical jig 11 is set on and brought into contact with the caulking ball 15 from above.

The cylindrical jig 11 is axially and downwardly moved and passed through the inner circumference 7c of the boss 7a. At this time, lubricant such as isopropyl alcohol (IPA) is fed into the lubricant path 19 of the cylindrical jig 11 with or without pressure.

The lubricant flowing out of the contact mouth 21 wets the caulking ball 15 to smoothly carry out caulking.

In practice, the carriage has a plurality of arms 23 and a plurality of head assemblies 1 are fitted to the arms 23, respectively, as illustrated in FIG. 7. The first embodiment sufficiently lubricates at each caulking process of attaching each head assembly 1 to each arm 23.

Namely, the caulking ball 15 that is set on outermost one of the bosses 7a, i.e., the boss 7a of a first head assembly passes through the boss 7a and the base plate 7, and then it drops onto the boss 7a of the base plate 7 of a second head assembly that is under the first head assembly. At this time, the caulking ball 15 separates from the contact mouth 21 of the cylindrical jig 11, to allow a sufficient amount of lubricant to be fed from the contact mouth 21 onto the caulking ball 15.

As mentioned above, the head assembly attaching method according to the first embodiment fits the head assembly 1 having the hollow boss 7a to the arm 23 having the through hole 25 of the carriage. The head assembly 1 includes the head suspension 3 that includes the load beam 5 and the base plate 7 fixed to the base part 6 of the load beam 5. The boss 7a is formed on the base plate 7 to be fitted to the through hole 25 with use of the caulking ball 15. The method includes steps of inserting the boss 7a into the through hole 25, thereby setting the head assembly 1 to the arm 23 of the carriage, supplying lubricant along the cylindrical jig 11 to the caulking ball 15 set on the boss 7a and pushing the caulking ball 15 with the cylindrical jig 11 to pass the caulking ball 15 through the inside of the boss 7a and diametrally expand and plastically deform the boss 7a, thereby fixedly fitting the boss 7a of the head assembly 1 to the through hole 25 of the arm 23 of the carriage.

The first embodiment smoothly carries out caulking with lubricant without deforming the flange 7b of the base plate 7 of the head assembly 1.

The head assembly 1 produced according to the first embodiment meets high precision requirements and has proper load and resonance characteristics. The first embodiment utilizes the cylindrical jig 11 to push the caulking ball 15 as the means to feed the lubricant to the caulking ball 15, thereby minimizing costs.

The first embodiment is capable of supplying a sufficient amount of lubricant to each caulking stage when successively attaching a plurality of head assemblies to a plurality of arms of a carriage. In this case, the first embodiment continuously supplies lubricant to the base plate 7 of each head assembly 1, to caulk the boss 7a without deforming the flange 7b.

Figure 3:
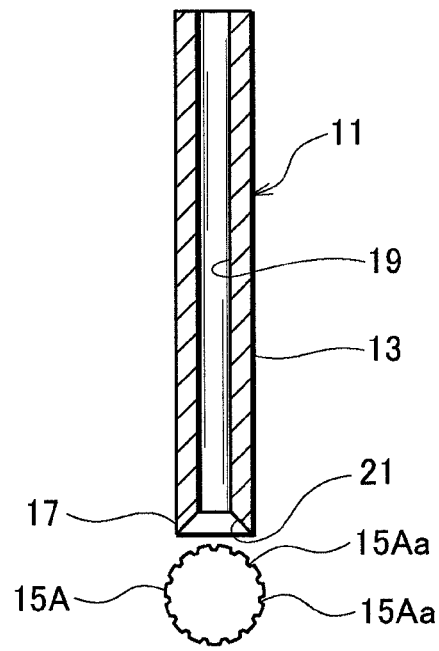
FIG. 3 is a sectional view illustrating the cylindrical jig and a modification of the caulking ball of FIG. 2.

FIG. 3 is a sectional view illustrating a modification of the caulking ball 15 as well as the cylindrical jig of FIG. 2. The caulking ball 15A illustrated in FIG. 3 has many irregularities, dimples or dents 15Aa on the surface thereof.

When the contact mouth 21 of the cylindrical jig 11 is brought into contact with the caulking ball 15A, the dents 15Aa form passages or channels with respect to the contact mouth 21, to feed lubricant from the lubricant path 19 up to a lower part of the caulking ball 15A even when the contact mouth 21 is in contact with the caulking ball 15A.

A second embodiment of the present invention will be explained with reference to FIG. 4 that is a sectional view and bottom view illustrating a cylindrical jig 11B. The cylindrical jig 11B according to the second embodiment is basically the same as the cylindrical jig 11 of the first embodiment illustrated in FIGS. 1 and 2, and therefore, the same or corresponding parts are represented with the same reference marks or the same reference marks plus "B" to avoid a repetition of explanation.

Figure 4:
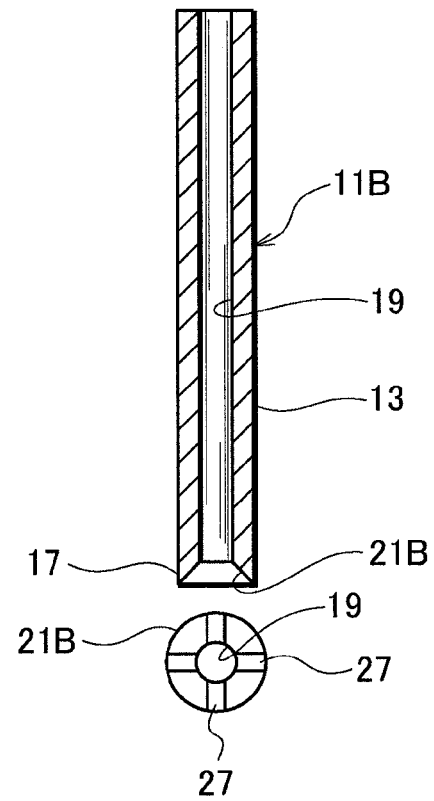
FIG. 4 is a sectional view and a bottom view illustrating a cylindrical jig according to a second embodiment of the present invention.

In FIG. 4, the cylindrical jig 11B has a tapered contact mouth 21B defined by a tapered face having axial grooves 27 that radially extend along the tapered face.

Even when the contact mouth 21B is in contact with a caulking ball 15, lubricant is smoothly passed from a lubricant path 19 formed through the cylindrical jig 11B to the caulking ball 15 through the grooves 27.

The second embodiment provides, in addition to the effect of the first embodiment, effect of surely feeding lubricant to the caulking ball 15 through the grooves 27.

Instead of or together with the grooves 27, irregularities, dimples or dents may be formed on the surface of the contact mouth 21B, to form passages and surely feed lubricant to the caulking ball 15.

A third embodiment of the present invention will be explained with reference to FIG. 5 that is a sectional view illustrating a cylindrical jig according to the third embodiment of the present invention as well as a caulking ball. The cylindrical jig 11C according to the third embodiment is basically the same as the cylindrical jig 11 of the first embodiment illustrated in FIGS. 1 and 2, and therefore, the same or corresponding parts are represented with the same reference marks or the same reference marks plus "C" to avoid a repetition of explanation.

Figure 5:
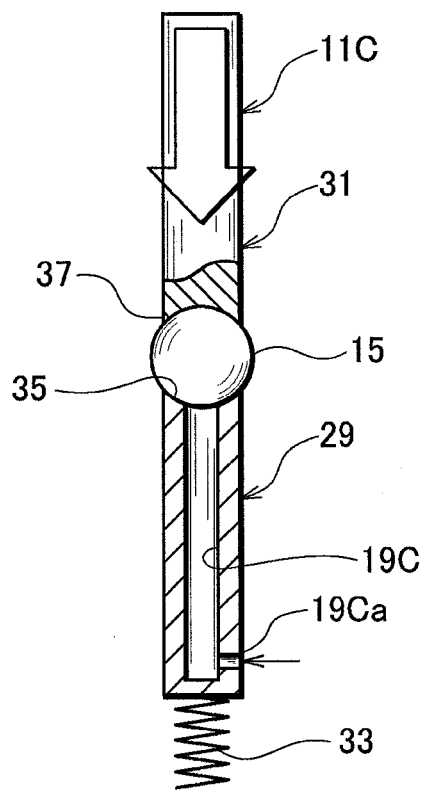
FIG. 5 is a sectional view illustrating a cylindrical jig according to a third embodiment of the present invention as well as a caulking ball.

In FIG. 5, the cylindrical jig 11C according to the third embodiment has first and second cylindrical bodies 29 and 31 and a coil spring 33 serving as a resilient member.

The first cylindrical body 29 has a lubricant path 19C that opens at an end of the first cylindrical body 29 where a tapered contact mouth 35 is formed to contact with a caulking ball 15. The contact mouth 35 communicates with the lubricant path 19C. The lubricant path 19C has a feed port 19Ca that is connected to a lubricant feed unit (not illustrated) on the other end of the first cylindrical body 29.

The coil spring 33 is arranged between the other end of the first cylindrical body 29 and a jig table (not illustrated), to push the first cylindrical body 29 toward the second cylindrical body 31.

The second cylindrical body 31 is solid and has a contact recess 37 at an end thereof.

The first and second cylindrical bodies 29 and 31 are arranged upward and downward in a pushing direction of the caulking ball 15 to hold the caulking ball 15 between them. The first cylindrical body 29 is upwardly positioned and the second cylindrical body 31 is downwardly positioned in the pushing direction.

Namely, the caulking ball 15 is placed on the contact mouth 35 of the first cylindrical body 29 and the contact recess 37 of the second cylindrical body 31 is set on and brought into contact with an upper part of the caulking ball 15. In this state, the second cylindrical body 31 is lowered.

As a result, the caulking ball 15 and first cylindrical body 29 descend against the coil spring 33, to caulk the boss 7a (FIG. 1). A movable range of the first and second cylindrical bodies with the coil spring 33 is adjusted to fit a plurality of head assemblies to a plurality of arms of a carriage.

Lubricant is fed with pressure from the feed port 19Ca into the lubricant path 19C and is discharged from between the caulking ball 15 and the contact mouth 35. The discharging of the lubricant is adjustable by adjusting the pressure applied to the lubricant and the spring constant of the coil spring 33.

Instead of such adjustment, the contact mouth 35 may be provided with irregularities, dimples or dents, or the caulking ball 15A illustrated in FIG. 3 may be employed, to discharge the lubricant.

The third embodiment provides the same effect as the first embodiment.

A fourth embodiment of the present invention will be explained with reference to FIG. 6 that is a sectional view illustrating a cylindrical jig 11D according to the fourth embodiment of the present invention as well as a caulking ball. The cylindrical jig 11D according to the fourth embodiment is basically the same as the cylindrical jig 11 of the first embodiment illustrated in FIGS. 1 and 2, and therefore, the same or corresponding parts are represented with the same reference marks or the same reference marks plus "D" to avoid a repetition of explanation.

Figure 6:
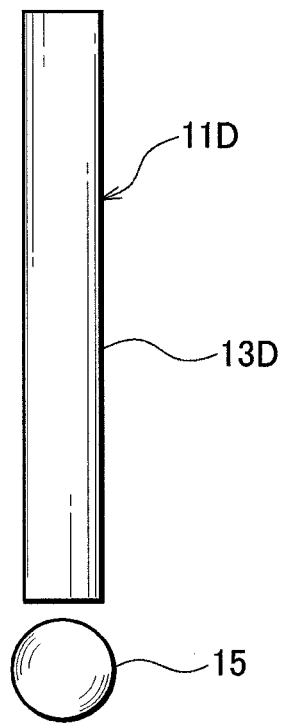
FIG. 6 is a sectional view illustrating a cylindrical jig according to a fourth embodiment of the present invention as well as a caulking ball.

In FIG. 6, the cylindrical jig 11D according to the fourth embodiment has a solid cylindrical body 13D so that an outer surface of the solid cylindrical body 13D guides lubricant. The fourth embodiment provides the same effect as the first embodiment.

The fourth embodiment may employ the caulking ball 15A illustrated in FIG. 3.

The fourth embodiment may form a caulking ball 15 integrally with the cylindrical body 13D. An outer surface of the cylindrical body 13D may have one or more grooves to guide lubricant. The grooves may continuously extend over an outer surface of the caulking ball that is integral with the cylindrical body 13D.

In the above explanation, each embodiment is applied to a head assembly having a load beam in which a rigid part, resilient part, and base part are integral with one another. The present invention is also applicable to a head assembly having a load beam in which a rigid part, resilient part, and base part are discrete and are connected together by welding, a load beam in which a rigid part and resilient part are integrated and a base part is discrete and welded to the resilient part, and a load beam in which a base part and resilient part are integrated and a rigid part is discrete and welded to the resilient part.

What is claimed is:

1. A method of attaching a head assembly having an annular hollow boss to an arm having a through hole of a carriage, the head assembly including a load beam of a head suspension and a base plate fixed to a base part of the load beam, the boss formed on the base plate to be fitted to the through hole with use of a caulking ball, the method comprising steps of:
    inserting the boss into the through hole, thereby setting the head assembly to the arm of the carriage;
    setting the caulking ball on the boss;
    bringing a cylindrical jig into contact with the caulking ball set on the boss such that an end of the cylindrical jig is set on the caulking ball;
    supplying lubricant along the cylindrical jig to the caulking ball set on the boss so that the lubricant is fed from the end of the cylindrical jig directly to an outer periphery of the caulking ball; and
    pushing the caulking ball with the cylindrical jig to pass the caulking ball through an inside of the boss and diametrally expand and plastically deform the boss, thereby fixedly fitting the boss of the head assembly to the through hole of the arm of the carriage.

2. The method recited in claim 1 wherein the cylindrical jig comprises:
    a cylindrical body;
    a lubricant path formed through the cylindrical body and opened at an end of the cylindrical body, the end of the cylindrical body being brought into contact with the caulking ball; and
    the lubricant path feeding the lubricant with or without pressure therethrough toward the caulking ball.

3. The method recited in claim 2 wherein the cylindrical jig further comprises:
    a tapered contact mouth formed at said end of the cylindrical body to communicate with the lubricant path and be brought into contact with the caulking ball.

4. The method recited in claim 3 wherein the cylindrical jig further comprises:
    an axial groove formed on the contact mouth to pass the lubricant toward the caulking ball.

5. The method recited in claim 1 wherein the cylindrical jig comprises:
    a solid cylindrical body feeding the lubricant along an outer surface of the solid cylindrical body toward the caulking ball.

6. The method recited in claim 1 wherein the caulking ball comprises:
    dents formed on the outer periphery of the caulking ball.

7. A method of attaching a plurality of head assemblies each having an annular hollow boss to a plurality of arms each having a through hole of a carriage, respectively, each head assembly including a load beam of a head suspension and a base plate fixed to a base part of the load beam, the boss formed on the base plate to be fitted to the through hole with use of a caulking ball, the method comprising steps of:

inserting the bosses into the through holes, respectively, thereby setting the head assemblies to the arms of the carriage;

setting the caulking ball on an outermost one of the bosses;

bringing a cylindrical jig into contact with the caulking ball set on an outermost one of the bosses such that an end of the cylindrical jig is set on the caulking ball;

supplying lubricant along the cylindrical jig to the caulking ball set on the outermost one of the bosses so that the lubricant is fed from the end of the cylindrical jig directly to an outer periphery of the caulking ball; and pushing the caulking ball with the cylindrical jig to successively pass the caulking ball through insides of the bosses and diametrally expand and plastically deform the bosses in the through holes, thereby fixedly fitting the bosses of the head assemblies to the plurality of the through holes of the arms of the carriage, respectively.

\* \* \* \* \*